March 17, 1953     A. J. FOLLI     2,631,619
RECIPROCATING SAW TOOL ATTACHMENT
Filed Sept. 3, 1949
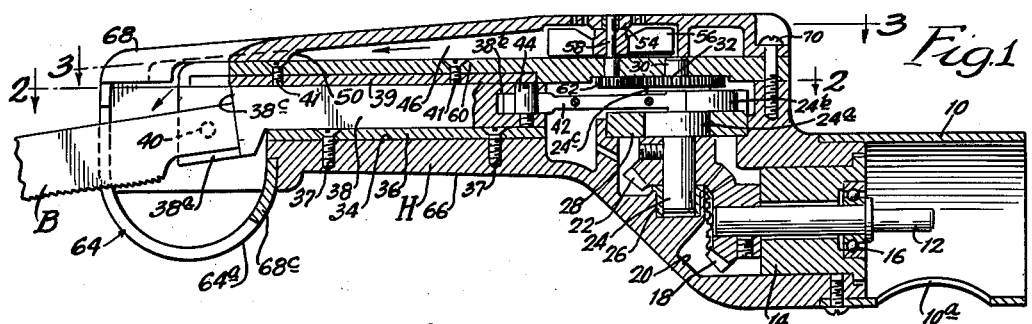
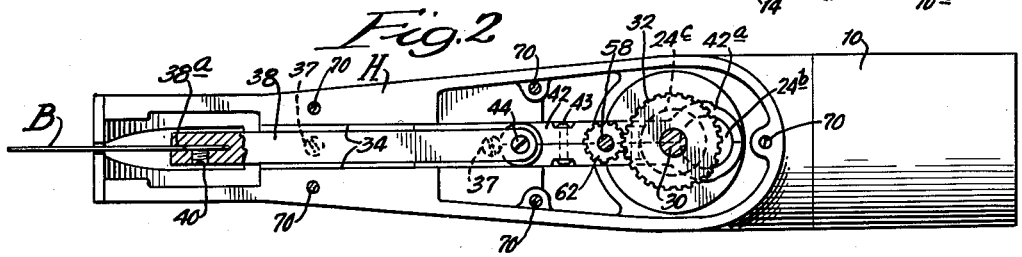
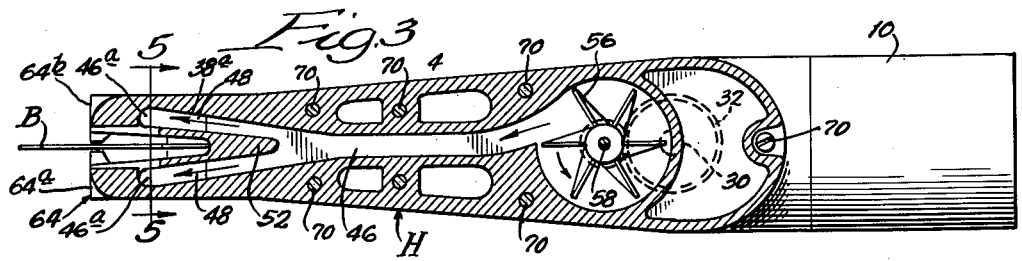
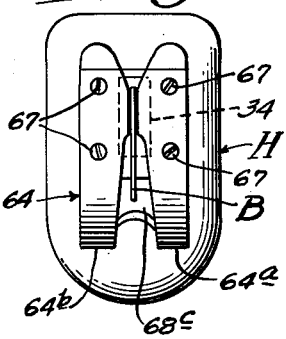 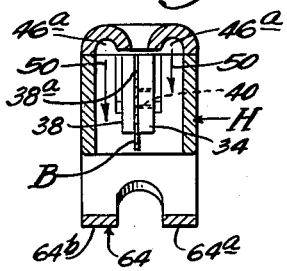
INVENTOR:
Arthur J. Folli,
BY ATTORNEYS.

Patented Mar. 17, 1953

2,631,619

UNITED STATES PATENT OFFICE 2,631,619

RECIPROCATING SAW TOOL ATTACHMENT

Arthur J. Folli, Chicago, Ill., assignor to RCS Engineering Corporation, Joliet, Ill., a corporation of Illinois Application September 3, 1949, Serial No. 113,932

10 Claims. (Cl. 143—68)

My invention relates to an improved attachment for rotary tools, such as hand drills, to convert them to receive reciprocating tools, such as a saw blade.

Attachments have heretofore been provided to convert rotary tools to receive reciprocating saw blades and the like. However, these attachments have been subject to overheating and, in addition, tend to become clogged with the dust or chips produced by operation. Moreover, these attachments have been difficult to use because no convenient method of support from the work surface is provided.

Moreover, reciprocating saw attachments for rotary tools cannot be readily attached to the tools other than by the spindle connection. This causes the attachment to tend to rotate with the spindle. If this rotation is unrestrained, the operator can easily be injured by the rapidly rotating unit.

In accordance with the present invention the tool attachment is cooled by an air stream adjacent the saw receiving piston. This stream leaves the attachment at points adjacent the saw blade and thereby blows dust or chips away from the blade. This prevents the unit from becoming clogged and at the same time keeps the blade free from dust so that the operator can view the work surface without interference from the accumulated dust or chips.

Moreover, in accordance with the present invention a saw guard is positioned adjacent the saw and defines a rest upon which the saw may be supported from the work surface. This guard is made substantially semi-circular in shape for rocking movement on the work surface.

In addition, the parts of the saw attachment of the present invention are displaced from the axis of the tool spindle. This provides a maximum radius arm against which the spindle must rotate the saw. If the saw is accidentally released, it drops to an inverted position and stays there without rotating.

In accordance with another feature of the present invention, a saw attachment for a rotary tool is designed to orient the blade in a tilted position relative to the axis of the attachment to achieve a uniform optimum feed of the saw into the work.

It is therefore a general object of the present invention to provide an improved reciprocating attachment for a rotary tool.

More specifically it is an object of the present invention to provide an improved reciprocating attachment for a rotary tool which attachment generates a stream of cooling and cleaning air.

Another object of the present invention is to provide an improved reciprocating attachment for a rotary tool having a convenient tool rest and guard.

Yet another of the present invention is to provide an improved reciprocating saw attachment for a rotary tool having features of construction combination and arrangement whereby the attachment will not rotate if accidentally released.

Still another object of the present invention is to provide an improved reciprocating saw attachment that provides optimum feed into the work when held perpendicular thereto.

The novel features which I believe to be characteristic of my invention are set forth with particularity in the appended claims. My invention, itself, however, both as to its organization and method of operation, together with further objects and advantages thereof, can best be understood by reference to the following description taken in connection with the accompanying drawings in which:

Fig. 1 is an axial cross-sectional view of the tool attachment of the present invention;

Fig. 2 is a cross-sectional view through the axis 2—2, Fig. 1;

Fig. 3 is a cross-sectional view through the axis 3—3, Fig. 2;

Fig. 4 is a front elevational view of the tool attachment of Fig. 1; and

Fig. 5 is a cross-sectional view through the axis 5—5, Fig. 3.

Referring to the figures, the housing structure of the tool attachment is indicated generally at H. This housing may be of any suitable material, such as cast aluminum. At the rear end it receives the cylindrical member 10 which is adapted to fit over the chuck of a rotary tool, such as a drill. A shaft 12 extends into the member 10 and is adapted to be received in the chuck of the drill to receive rotations in accord with the rotations of the tool spindle. The member 10 is provided with an opening 10a to provide access to the chuck to clamp the shaft 12 snugly therein.

The shaft 12 is supported from insert 14 in the housing H and is held therein by ball bearing 16. At its opposite end the shaft terminates in bevel gear 18 which fits in cavity 20 of the housing H. The gear 18 meshes with the bevel gear 22 which is held on the transverse or vertical shaft 24, which shaft is held in position by sleeve bearing cup 26, insert block 28, and the upper sleeve bearing cup 30.

Intermediate bearing cups 26 and 30, and adjacent the block 28, the shaft 24 enlarges at 24a to define a disk to support the eccentric pin or bearing 24b. Above this pin the shaft defines another enlarged concentric portion 24c which is adjacent to the spur gear 32.

At its front end the housing H defines a longitudinal cavity or track 34. The lower side of this cavity is lined with the bearing liner or plate 36 which is secured to housing H by the screws 37. This bearing liner is of smooth configuration and is adapted to receive the reciprocative saw-receiving piston 38 with a minimum degree of friction. The upper side of the track 34 is lined with the bearing liner or plate 39 which is secured to housing H by the screws 41.

The piston 38 is of rectangular cross-section and slidably fits in the housing H. At its front end the piston 38 is provided with a slot 38a which receives the end of flat saw blade B. This blade fits relatively snugly in the slot and is anchored therein by the headless set screw 40 which engages one side of the blade to force the other side firmly against the slot 38a and thus cause a firm frictional engagement between the blade and the piston.

The slot 38a terminates at its rear end in wall 38c which receives the end of the saw blade B. This wall is at an angle of about 82 degrees relative to the longitudinal axis of the piston 38, thus giving the blade a downward tilt of about 8 degrees when inserted to the bottoming position against the wall 38c.

The piston 38 is connected at its rear end with the eccentric portion 24b of the shaft 24 so that the piston reciprocates in accord with the rotations imparted to the shaft. This connection is achieved by the split crank arm 42 which is received in slot 38b of the piston 38 and is pivotally connected thereto by the pin 44. At its opposite end 42a the crank arm encircles the eccentric portion 24b of the shaft 24 to define a pitman or crank in conjunction therewith. As shown, the crank arm 42 is defined by two half sections secured together by rivets 43.

It will be apparent that when the shaft 12 is rotated by the rotary tool to cause shaft 24 to execute like rotations, the crank arm 42 imparts reciprocating movements to the piston 38.

In accordance with the present invention, the housing H is cooled adjacent the piston 42 and the blade B is kept free of chips or dust by a cooling air stream drawn into the longitudinal cavity 46. As shown in Fig. 1, this cavity extends along the length of the housing H in the region just above the piston 38 and terminates at the rear end just above the shaft 24. At its forward end the cavity 46 terminates in a pair of outlet openings 46a, on each side of the blade B.

The outlet openings 46a direct air from the duct 46 to the blade B. This is shown by the arrows 48, Figs. 3 and 50, Fig. 5, which show the direction of air travel in the horizontal and vertical planes respectively. Behind these openings the housing H forms the post 52 which divides the air stream into the two separate portions. Rearwardly of this post, the cavity 46 forms a single channel or duct.

A plurality of openings 54 are formed in the top of the housing H adjacent the rear end of the duct 46. A fan 56 is mounted immediately below these openings and is received on shaft 58 which is supported by the web portion 60 of housing H which is formed by the cavity 46 and the track 34. As shown in Fig. 3, the housing H defines a casing about fan 56 with a tangential outlet opening into the duct 46.

The gear 62 is formed on the end of shaft 58 opposite fan 56 and is in mating relation with the spur gear 32. The radius of gear 62 is much smaller than gear 32 so that the shaft 58 executes many rotations for each rotation of the shaft 24. Preferably the ratio of gears 32 and 62 is chosen to step up the rotations of shaft 58 to approximately 9000 R. P. M. from the speed of shaft 24 which is preferably about 2500 R. P. M.

The housing H is formed by a lower part 66 and an upper part 68 held together by the screws 70. These parts mate to define the housing and the cavities therein.

When the shaft 12 is rotated to cause rotations of the shaft 24, reciprocating motions are imparted to the piston 38 and the saw blade B. At the same time rotations are imparted to the centrifugal fan 56. The latter rotations draw air into the duct 46 through the openings 54 as indicated by the arrows of Fig. 1. The air so drawn in travels down the length of the duct 46 and is discharged on each side of the blade B through the air directing openings 46a.

The air flow through the duct 46 cools that duct and removes any heat generated by friction of the piston 38 with the housing H as it executes its reciprocating movements. Since the duct 46 is parallel to and close to the piston-receiving cavity 34, the cooling of duct 46 effectively cools the piston 38. This air flow further is directed by the openings 46a to travel along the blade B to blow shavings or dust away from the end of the unit and away from the portion of the work adjacent the blade. This prevents chips or shavings from jamming the mechanism and, in addition, provides a clear view of the work and the blade unobstructed by the piles of chips or shavings that tend to accumulate.

The cooling achieved by the air stream has proven so effective that the saw may be operated for long periods without becoming uncomfortable to the hand.

Further in accordance with the present invention the saw is provided with a rest or stand 64 at its front end. This rest is defined by straps 64a and 64b, one on each side of the blade B which unite at the portion 64c. At their forward ends the straps are anchored to the front end of housing H by the screws 67. At its rear end the rest 64 is anchored to the portion of the housing immediately under the end of member 36 by the spring pressure of the rest. Intermediate its ends, the strap extends downwardly on opposite sides of the blade B and then curves backwardly in a semicircular shape to form a semicircular support for the housing H.

The rest or guard 64 protects the end portion of the piston 38 from the work or other objects that may reach that portion of the mechanism and become jammed therein. It further acts as a rest to hold the front portion of the tool at a predetermined spaced relation with the work. The operator can bear down on this rest to hold the tool securely against the work and achieve uniform spacing of the tip of the tool from the work. The semi-circular configuration of the guard permits the tool to be rocked about the center of the circle thus defined without altering the distance between the tool and the work. The amount of sliding movement of the tool along the work is thereby minimized. Moreover, this curved shape may easily be moved over irregularities in the work.

It will be observed that the piston 38 is spaced from the axis of the spindle 12 and that the fan 56 and the housing H extend to an even greater spaced relation from that axis. This gives the unit a maximum degree of eccentricity with respect to the axis and minimizes the force that must be exerted by the operator to hold the saw against the torque developed by the reaction to gear 18. More important, the degree of eccentricity provided is sufficient to hold the housing H against rotation in response to the gear reaction even when completely released. If, for example, the operator is sawing in the upright position of Fig. 1 and accidentally releases the housing H, the unit rotates to an inverted position in response to the gear reaction torque and the force of gravity. However, once inverted, it only rotates to a slightly further position as required to produce gravity torque adequate to equalize the reaction of gear 18 when the unit is running free. In actual models of the present invention, this additional rotation is only about 30 degrees and in that position the housing H exhibits no further tendency to rotate.

The foregoing feature of the present invention is of considerable importance to the operator, for rotating housing and saw blade are exceedingly dangerous. The blade executes about 2500 reciprocations per minute and readily cuts flesh or any other substance it contacts, with the consequence that the operator is readily injured. If the housing H rotates, the blade travels about a considerable arc and easily causes injury or damage over a large space. The present invention avoids this problem by preventing the saw rotations.

By designing the piston 38 to receive the blade B at the preferred tilt relative to the axis of the piston, the feed of the blade is maintained at the optimum value. This is quite important since even slight departures from the preferred tilt cause relatively great changes in the rate of feed.

While I have shown and described a specific embodiment of my invention it will of course be understood that I do not wish to be limited thereto and that by the appended claims I intend to cover all modifications and alternative constructions as fall within the true spirit and scope of my invention.

What I claim as new and desire to secure by Letters Patent of the United States is:

1. An attachment for a rotary tool comprising a housing, a member mounted for reciprocating movement lengthwise in the housing and adapted to receive a saw blade for operation thereof, an operative connection between said tool and said member for imparting reciprocating movement thereto within the housing when in the assembled relation, fan means within said housing for generating an air stream, and an air channel in communication with said fan means and extending lengthwise through said housing for cooling same, said air channel turning downwardly through the end portion of the housing to direct the air stream downwardly alongside the lower edge of the saw blade for eliminating dust therefrom and from the surface of the work in the area being cut.

2. An attachment for a rotary tool comprising a housing, a member mounted for reciprocating movement lengthwise in the housing and adapted to receive a saw blade for operation thereof, an operative connection between said tool and said reciprocating member for imparting reciprocating movement thereto when in the assembled relation, fan means operatively connected to said tool for generating an air stream, and an air channel in communication with said fan means for extending lengthwise through the upper portion of the housing for cooling same, said air channel separating into independent laterally spaced channels ending alongside the saw blade to direct air streams onto opposite sides thereof and in which the laterally spaced channels turn downwardly at their end portions to direct the air streams downwardly alongside the blade onto the work being operated upon.

3. An attachment as claimed in claim 1 in which said air channel extends forwardly beyond the rear edge of the blade to direct streams of air downwardly onto intermediate portions thereof.

4. An attachment for a rotary tool comprising a housing, a member mounted for reciprocating movement lengthwise in the housing and adapted to receive a working tool for operation thereof, an operative connection between said rotary tool and said member for imparting reciprocating movement thereto when in the assembled relation, air stream generating means located within the housing, an air channel extending through the upper portion of the housing above the working tool and divided rearwardly of the working tool into separate channels which turn in the downwardly direction near the end portion of the housing for directing separate air streams downwardly onto the bottom edge of the working tool and substantially in parallel relation therewith to remove particles from the operating edge of the tool and the area of the work being operated upon.

5. An attachment as claimed in claim 1 in which the fan means is located in the upper portion of the chamber above its center of gravity and the air channel extends lengthwise therefrom in the upper portion of the chamber above the reciprocating member.

6. An attachment for a rotary tool comprising a housing, a member mounted for reciprocating movement lengthwise in the housing and adapted to receive a saw blade for operation thereof, an operative connection between said tool and said member for imparting reciprocating movement thereto when in the assembled relation, and an abutment in the edge portion of the reciprocating member having an angle of about 82 degrees with the reciprocating member and against which the edge of the blade rests in the assembled relation to position the blade at an angle of about 8 degrees with the reciprocating member in position of use.

7. An attachment for a rotary tool comprising a housing, a member mounted for reciprocating movement lengthwise in the housing and adapted to receive a saw blade for operation thereof, an operative connection between said tool and said member for imparting reciprocating movement thereto when in the assembled relation, means for generating an air stream passing through the housing and projecting in a downwardly direction from the end thereof, and a guide member secured at its upper edge portion to the forward edge of the housing and having a slotted portion formed of narrow dimension at the upper end through which the blade extends and which flares out to greater dimension therebelow for passage of the air streams therethrough onto the surface of the work.

8. An attachment for a rotary tool comprising a housing, a member mounted for reciprocating movement lengthwise in the housing and adapted to receive a saw blade for operation thereof, an operative connection between said tool and said member for imparting reciprocating movement thereto when in the assembled relation, means for generating an air stream passing through the housing and projecting in a downwardly direction from the end thereof, and a unitary guide plate in the form of a curvilinear resilient member secured at one end portion to the forward edge of the housing and anchored at the other end onto a spaced underside of the housing and having an intermediate portion slotted to permit passage of the blade therethrough with the slotted portion increasing in dimension therebelow to permit passage of the air stream onto the work.

9. An attachment for a rotary tool comprising a housing, a member mounted for reciprocating movement lengthwise in the housing and adapted to receive a saw blade for operation thereof, an operative connection between said tool and said member for imparting reciprocating movement thereto when in the assembled relation, and an abutment in the edge portion of the reciprocating member having an angle slightly less than 90 degrees with the reciprocating member and against which the rear edge of the blade rests when in the assembled relation to position the blade at a slight angle with the reciprocating member in position of use.

10. An attachment for a rotary tool comprising a housing, a shaft mounted for reciprocating movement lengthwise in the housing and adapted to receive a saw blade on the end portion thereof, said end portion of the shaft upon which the saw blade is mounted being defined by a wall which supports the blade at a slight angle of less than 10 degrees to the axis of the shaft and clamping means cooperating with said end portion for mounting the saw blade thereon at a corresponding angle with the axis of the shaft.

ARTHUR J. FOLLI.

REFERENCES CITED

The following references are of record in the file of this patent:

UNITED STATES PATENTS

| Number | Name | Date |
|---|---|---|
| 30,475 | Griffith | Oct. 23, 1860 |
| 536,980 | Wilson | Apr. 2, 1895 |
| 1,623,290 | Wappat | Apr. 5, 1927 |
| 1,679,884 | Thomas | Aug. 7, 1928 |
| 1,793,053 | Cahill et al. | Feb. 17, 1931 |
| 1,808,228 | Hulack et al. | June 2, 1931 |
| 1,898,956 | Harvie | Feb. 21, 1933 |
| 2,122,611 | Kirby | July 5, 1938 |
| 2,337,769 | Redenbo | Dec. 28, 1943 |
| 2,548,411 | Vache | Apr. 10, 1951 |